Fig.1.

Dec. 12, 1961 J. H. SCHWALBE 3,013,260
AUTOMATIC RANGE TRACKING SYSTEM
Filed May 27, 1954 4 Sheets-Sheet 2

Fig. 2.

INVENTOR
JULIAN H. SCHWALBE
BY
ATTORNEY

Fig. 3.

INVENTOR
JULIAN H. SCHWALBE
BY
R.V. Craddock
ATTORNEY

Dec. 12, 1961     J. H. SCHWALBE     3,013,260
AUTOMATIC RANGE TRACKING SYSTEM
Filed May 27, 1954                  4 Sheets-Sheet 4

INVENTOR
JULIAN H. SCHWALBE
BY
ATTORNEY

United States Patent Office 3,013,260
Patented Dec. 12, 1961

3,013,260
AUTOMATIC RANGE TRACKING SYSTEM
Julian H. Schwalbe, Franklin Square, N.Y., assignor to Sperry Rand Corporation, a corporation of Delaware
Filed May 27, 1954, Ser. No. 432,668
20 Claims. (Cl. 343—7.3)

This invention relates to an automatic range tracking system, and more particularly to such a system in which targets are continued to be tracked only if they move with a preselected component of direction and have at least a preselected minimum velocity along said component.

Radar gun-laying systems are frequently provided with means for effecting a search mode of operation in which the directional search pulses are caused to rapidly scan a sector. The sector scanned may be a solid angle including portions of the land, sea or sky and may be scanned spirally, in rectilinear sweeps, or in some other manner. If a reflection is received from an object, the search mode of operation may be automatically discontinued and the radar may begin to automatically track the acquired target in azimuth, elevation and range while supplying data relative to the target in these three coordinates to the computer controlling the guns. Such an acquired target could be an enemy craft out of gun range and moving away from the guns, a stationary object such as a water tower, or other undesirable target. The radar operator, either by direct observation of the target or by study of the radar target indication, may decide that the target is not to be shot at and may, by manipulation of the controls, cause the radar to cease its tracking and return to the search mode in quest of another target. However, if there is an enemy craft approaching at high speed to attack, it is essential that the radar not lock on and track unwanted targets for any appreciable length of time. A high speed aircraft is within gun range for only a short time and much of this time is required for the radar to lock on the desired target and supply the necessary coordinates of position, for the computer to calculate the proper firing angles, for the guns to slew into position, and for the shell to travel to the attacking craft.

This invention provides a radar system which momentarily locks on any targets encountered during the search mode, samples the rate of change of range of the target over a very short time interval, then abandons the target and continues on in the search mode unless the target being tracked is found to be moving toward the radar equipment with a component of velocity which is above a predetermined minimum.

It is an object of this invention to provide a tracking system which will continue to track only those targets having a predetermined velocity characteristic.

It is a further object of this invention to provide an automatic tracking system arranged for automatic rejection of unwanted targets and which will continue to track a desired target even though it momentarily fades or its velocity in the preselected direction passes through zero.

It is an object of this invention to provide an automatic tracking system which will cyclically search for a target in range, upon finding a target will track it in range and upon rejection of an unwanted target, will return to its search in range at substantially the point in the cycle where it last searched.

Other objects and advantages of this invention will become apparent to those skilled in the art from a consideration of the following specification taken in conjunction with the accompanying drawings in which.

Figure 1:
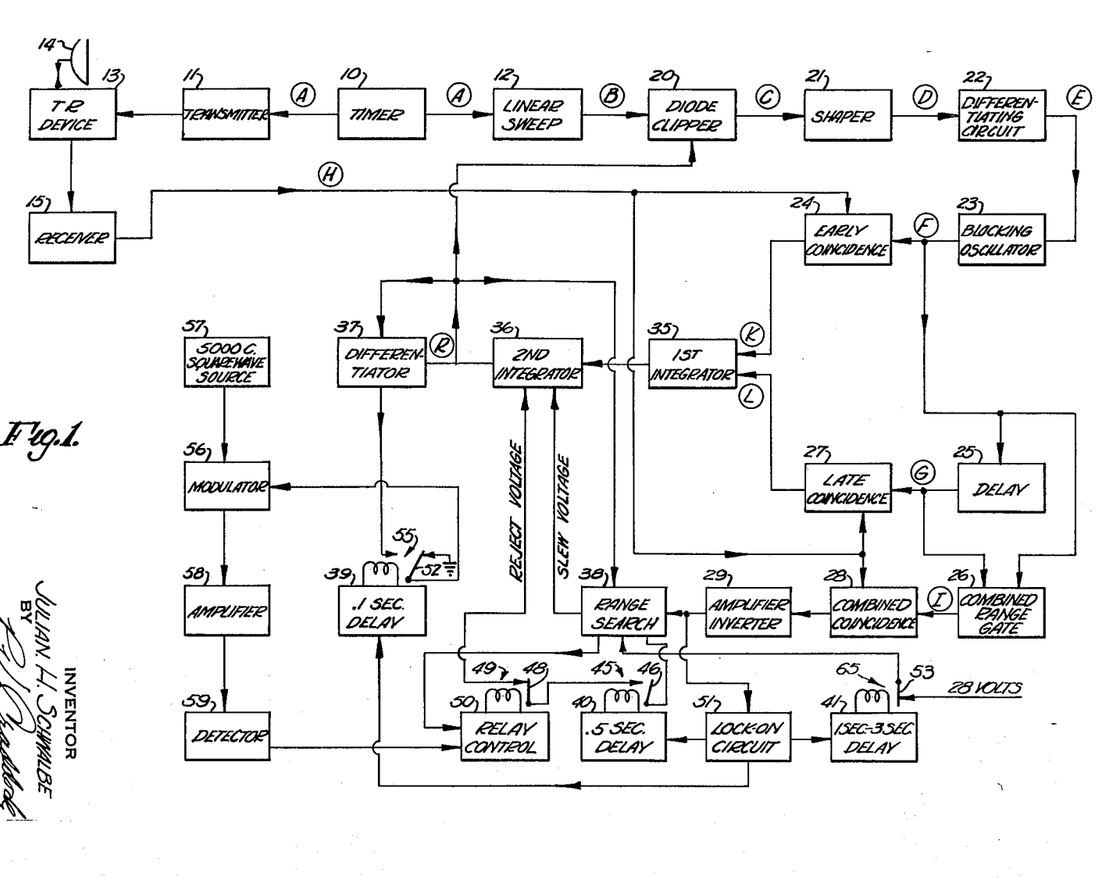
FIG. 1 is a block diagram of a radar system embodying the principles of this invention.

In the radar system shown in FIG. 1, the timer 10 generates a continuous succession of electrical pulses, which may be separated by either regular or irregular time intervals, and supplies these pulses to both the transmitter 11 and the linear sweep circuit 12. Transmitter 11 generates a short pulse of radio energy, preferably in the microwave region, upon the application of each pulse from the timer 10. The radio pulses from the transmitter 11 are transmitted through the transmit-receive device 13 to the directional antenna 14. Antenna 14 is also connected through transmit-receive device 13 to the receiver 15.

Linear sweep circuit 12, upon the receipt of each timing pulse from timer 10, produces a sawtooth wave which slowly rises and rapidly falls. This linear sweep wave is applied to the input of the diode clipper circuit 20 which operates with a variable bottom bias. The output of diode clipper circuit 20 is applied to shaper circuit 21, which greatly amplifies and clips the top of the wave supplied by the diode clipper 20 to produce a square wave. The square wave produced in the shaper circuit 21 is applied to the input of the differentiating circuit 22 causing the production of a positive spike at the beginning, and a negative spike at the end, of the square wave. The output of the differentiating circuit 22 is applied to the blocking oscillator 23 where the positive spike trips the blocking oscillator to provide a short pulse, the early gate pulse. The output of blocking oscillator 23 is applied to delay circuit 25 which produces a delayed short pulse, the late gate pulse.

The early gate pulse produced by the blocking oscillator 23 and received echoes from receiver 15 are applied to the early coincidence circuit 24. The late range gate from delay circuit 25 is applied with echoes from receiver 15 to the late coincidence circuit 27. Coincidence circuits 24 and 27 produce an output only when the respective gate pulses applied thereto coincide with the echo pulse from receiver 15. Coincidence circuits 24 and 27 may advantageously be pentode tubes with one input applied to the control grid and the other input applied to the suppressor grid. The early range gate from blocking oscillator 23 and the late range gate from delay circuit 25 are applied to combined range gate circuit 26 which combines the early and late range gate pulses into a single gate pulse having the combined width of the two input pulses. This combined gate pulse is applied to the input of the combined coincidence circuit 28, to which is also fed as an input, the echo signal from receiver 15. Circuit 28 is similar to circuits 24 and 27.

The outputs of the early coincidence circuit 24 and the late coincidence circuit 27 are applied to the input of the first integrator circuit 35. The first integrator circuit 35 produces in its output unipotential voltage representing the integral of the ratios of the coincidence signals applied thereto. This output is applied to the second integrator circuit 36 which produces in its output a unipotential voltage representing the integral of the signal applied at its input. This output voltage is applied to differentiator circuit 37 and to the input of diode clipper circuit 20 in which it controls the height at which the bottom is clipped from the applied sawtooth wave.

The output of the combined coincidence circuit 28 is applied through amplifier-inverter 29 to the range search circuit 38 and the lock-on circuit 51. The range search circuit 38 provides a cyclically varying range slew voltage to the second integrator 36. This range slew voltage causes the radar system to search in range for a target when the system is not already tracking a target. The output of the range search circuit 38 is preferably a slowly rising and rapidly falling sawtooth wave which causes the range search to start at a preselected range near the radar equipment, and slowly search out to a preselected outer limit and then rapidly return to repeat the cycle.

The range search circuit 38 also supplies to the movable contact arm 46 of normally open relay 45, which is operated by the .5 second delay circuit 40, a plus voltage if the range is slewing out and a minus voltage if the range is slewing in. The normally open contact of relay 45 is connected to the movable contact arm 48 of the relay 49 which is controlled by the relay control circuit 50. The normally closed contact arm 48 of relay 49 supplies the reject voltage to the second integrator 36 to cause the second integrator circuit to abandon the target then being tracked.

The output of the combined coincidence circuit 28 is also applied through amplifier-inverter 29 to the lock-on circuit 51 which applies a ground connection, upon the production of a pulse in the output of circuit 28, to delay circuits 39, 40 and 41 to initiate operation of these circuits.

The .1 second delay circuit 39 controls relay 55 having movable contact arm 52, which, in the normally unenergized condition of the relay, connects the modulating input of modulator 56 to ground. In this unenergized condition, the output of differentiator 37 is connected to the open contact of relay 55. When relay 55 is energized the output of differentiator 37 is connected to the input of modulator 56 where it modulates the 5000 cycle square wave from the source 57. The output of modulator 55 is amplified in amplifier 58 and is detected in detector 59. The output of detector 59 is applied to relay control circuit 50.

The 1 second—3 second delay circuit 41 energizes relay 65 one second after the ground connection is applied to circuit 41 by lock-on circuit 51. This opens the normally closed contacts 53 of relay 65 and removes a power source of 28 volts from the range search circuit 38 which disables the range search circuit and, through a connection from the range search circuit to the relay control circuit 50, also disables the latter circuit. When the relay 65 is in its energized and open position, it is deenergized three seconds after the removal of the ground connection by operation of lock-on circuit 51 in response to the disappearance of an output in combined range gate coincidence circuit 28.

Figure 4:
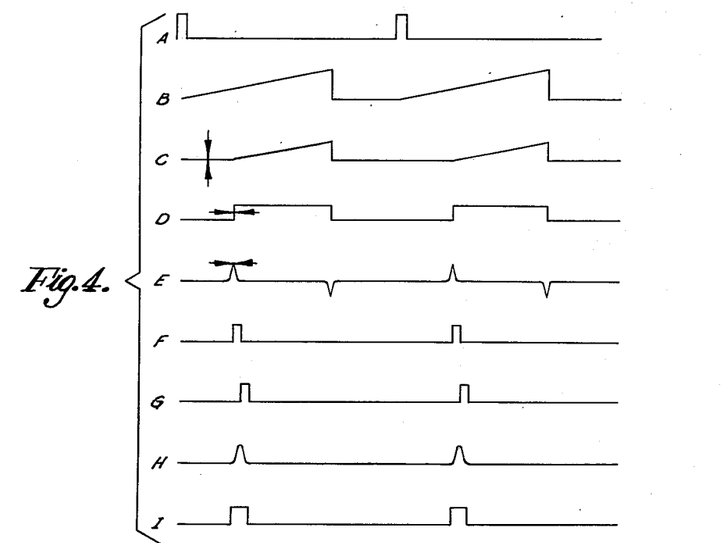
FIG. 4 is a series of curves used in explaining the operation of the system of FIG. 1.

In the operation of the system described above, the timer 10 controls the production of radio frequency pulses by the transmitter 11. FIG. 4 shows waveforms, in their relation as to time, produced at various points in the system herein described. Plot A shows the timing pulses produced by timer 10. The radio search pulses produced by transmitter 11 are in substantial time coincidence with the timing pulses of plot A. The points where the waveforms of FIG. 4 appear is shown by corresponding letters in FIG. 1, and, where appropriate, in FIG. 2.

The radio frequency pulses from transmitter 11 are transmitted through the transmit-receiver device 13 to the antenna 14, which produces a highly directional beam of radio frequency search pulses. When these search pulses impinge on an object, reflections are sent back and received by the antenna 14. These echoes are transmitted through the transmit-receive device 13 to the receiver 15. The transmit-receive device 13 protects the receiver from the large bursts of radio frequency energy transmitted by the transmitter 11 and channels the weak echoes into the receiver 15 to the exlusive of the transmitter 11.

The sawtooth wave (plot B of FIG. 4) produced in linear sweep circuit 12 and initiated by pulses from timer 10 is applied to diode clipper 20 where the bottom of the sawtooth wave is clipped at a variable height in response to the output of second integrator 36 (plot C of FIG. 4). It will be understood that the rising linear sweep from circuit 12 may continue to rise until a new sweep wave is initiated by the subsequent timing pulse, but it is preferred to discontinue this linear rise prior to the occurrence of the subsequent timing pulse. The clipping causes the point of the beginning of the linear sweep to vary in time with respect to the occurrence of the timing pulses from the timer 10.

The output of diode clipper circuit 20 is applied to the shaper circuit 21 where the clipped sawtooth wave is amplified and clipped, giving a substantially square wave, the leading edge of which varies in time with respect to the trailing edge and with respect to the corresponding timing pulse. The square wave from shaper 21, seen in plot D of FIG. 4, is applied to the differentiating circuit 22 where the leading edge of the square wave causes a positive spike and the trailing edge of the square wave produces a negative spike seen in plot E of FIG. 4. The positive spoke varies in position with respect to the negative spike and to the occurrence of the initiating timing pulse from the timer 10. The output of the differentiating circuit 22 is applied to the blocking oscillator 23 where there is produced an early gate positive pulse (plot F of FIG. 4) simultaneous in time with the positive pulse produced in the differentiating circuit and variable in time with respect to the initiating timer pulse. The late gate pulse (plot G of FIG. 4) is delayed so that its leading edge is substantially in time coincidence with the trailing edge of the early gate pulse.

The coincidence of the early range gate and the late range gate with the echo signal is an indication of the acceleration of the object being tracked.

In FIG. 4, the early range gate, the late range gate, the echo pulse, and the combined range gate are shown in plots F, G, H and I, respectively. The indication of acceleration given by the above-mentioned coincidence is integrated in the first integrator circuit 35 to produce an output which is indicative of the velocity of the object being tracked. This in turn is integrated in the second integrator circuit 36 to give an output representative of the position of the object being tracked. If the echo signal is being accurately bisected by the trailing and leading edges, respectively, of the early and late range gate there will be no change in the outputs of the first and second integrators. However, if there is more output in the early coincidence circuit showing that the object has changed its velocity there will be a corresponding change in the outputs of the first and second integrators, causing the bias on the diode clipper to be lowered and the early and late range gates to be accelerated toward the initiating timer pulse.

If the antenna 14 is being moved in a spiral or linear search scan, the range search circuit 38 causes the bias on the diode clipper 20 to be cyclically moved up and down. This causes the early, late and combined range gates to move throughout the selected portion of range in search of a target.

It is preferable to have the range gate start at the innermost end of the selected range portion and slowly search out to the end of the range portion and then to rapidly return to the inner range and again start. If there are a plurality of desirable targets its is preferable to destroy the nearest one first and with this type of range search, the radar equipment will begin to track the nearest target first.

When the radar apparatus is operating in its search mode and encounters an echo, the range gates will coincide with echo at some time in their sweep. When the combined range gate coincides with the echo an output will appear in the combined coincidence circuit 28. This is applied to the range search circuit 38, to stop the operation of that circuit and the further search in range for a target and is also applied to lock-on circuit 51 which then operates after a tenth of a second the relay 55, after a half second the relay 45, and after one second the relay 65.

The operation of relay 55 after a tenth of a second of the appearance of an echo, applies the output of the differentiation circuit 37 to the modulator 56. The output of the differentiation circuit 37 is representative of the velocity of the target being tracked. This output modulates in modulator 56 the 5000 cycle square wave from the source 57 and affects through amplifier 58 the output of detector 59 which is applied to relay control 50. The delay of .1 second gives the tracking components time to settle in the tracking operation and prevents the application of a spurious transient to the modulating circuit. Such application of a spurious transient might affect the modulating circuit, due to its time constant, until after the closing of relay 45.

It will be understood by those skilled in the art that square wave source 57, modulator 56, amplifier 58, and detector 59 could all be replaced by a direct current amplifier. However, the use of the modulation-detection system shown in FIG. 1 is considered preferable because of the tendency of a direct current amplifier to drift.

If the differentiated signal in the output of differentiator circuit 37 is not of sufficient amplitude or is of the wrong polarity to operate the relay 49, showing that that tracked target is not approaching the guns at the selected velocity, on the closing of contact arm 46, one-half second after the acquisition of the target, the rejection voltage will be applied to the second integrator causing the bias on the diode clipper to be raised or lowered so that the range gates will move away from the echo being rejected. The range search circuit becomes operative by the disappearance of an output from circuit 28 and will again control the second integrator to cause the system to resume its search for a desirable target.

However, if the signal from differentiator circuit 37 is of sufficient amplitude and of proper polarity, indicating that the target is approaching the gun with at least a certain speed, it will operate relay control 50 to energize relay 49 and open the contacts 48. The opening of contact arm 48 prevents the application of the rejection voltage from range search circuit 38 to the second integrator circuit 36 upon the closing of relay 45 at .5 second after the target was initially tracked. The radar system will continue to track this target.

The range search circuit 38 supplies as a rejection voltage to the contact arm 46 a polarity which will cause the range gates, upon a rejection, to move in a direction in which they were last moving during a range sweep in the search mode.

If the target proves to be desirable and is acquired by the tracking system, one second after the target has appeared in the combined range gate, relay 65 operates to disconnect the enabling twenty-eight volts from the range search circuit 38 which in turn removes a corresponding enabling voltage from the relay control circuit 50. If then the signal from the detector 59 disappears as when the tracked enemy craft maneuvers and its velocity decreases below the selected minimum, or if the echo fades for atmospheric reasons, the range search circuit cannot operate to resume the search and the relay 49 will remain in opened position. If the signal being tracked in the combined range gate disappears, and the lock-on circuit removes ground from delay circuit 41, for three seconds, the relay 65 will be deenergized providing an enabling voltage for the range search circuit 38 and allowing the relay 49 to assume its normal closed position.

Figure 2:
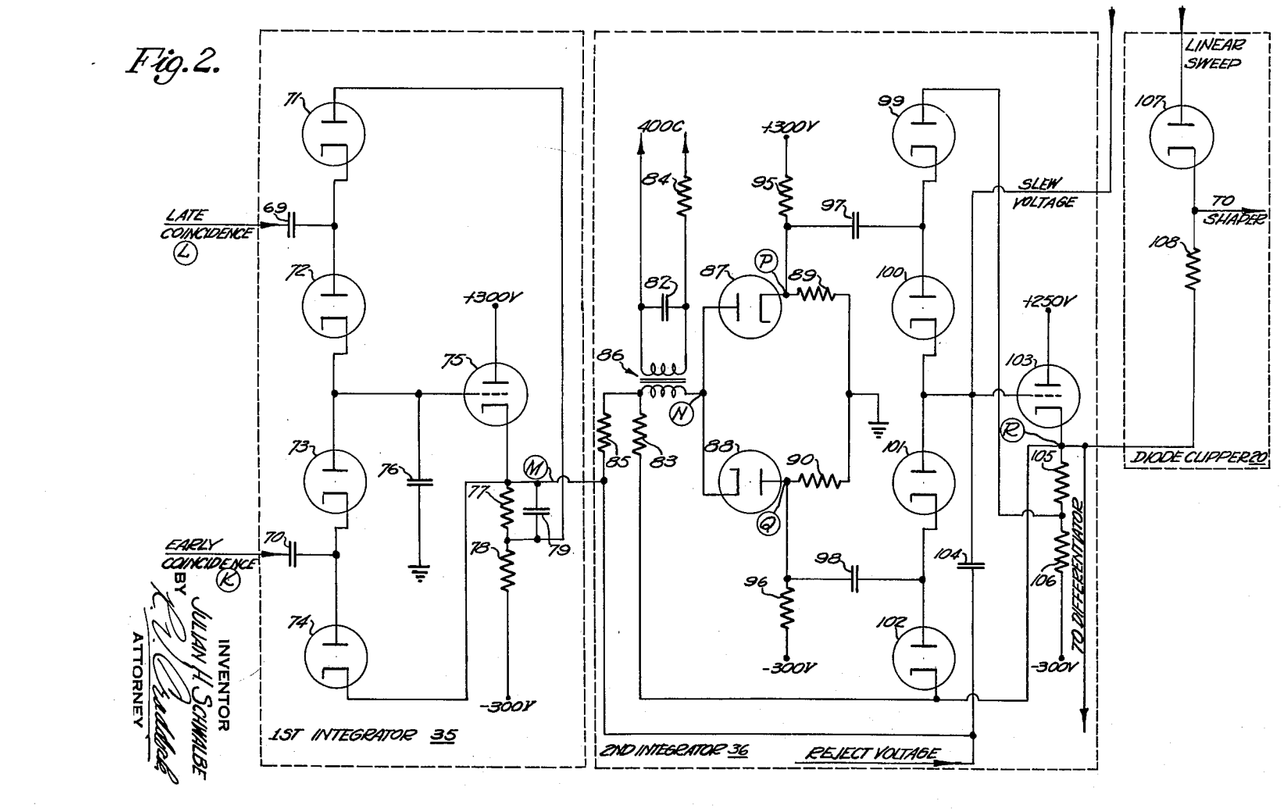
FIG. 2 is a schematic diagram showing the first and second integrating circuits and the diode clipper of FIG. 1.

Reference is now made to FIG. 2 for a detailed description of the first and second integrator circuits. First integrator circuit 35 includes four diodes 71 through 74 inclusive, which are connected in series, and cathode follower 75. The output from the late gate coincidence circuit 27 is connected to the cathode of diode 71 and anode of diode 72. The output of the early range gate coincidence circuit 24 is applied to the cathode of diode 73 and the anode of diode 74. The junction of the cathode of diode 72 and the anode of diode 73 is connected to the control grid of triode 75 and through condenser 76 to ground. The cathode of triode 75 is connected through cathode resistors 77 and 78 to minus battery and is also connected to the cathode of diode 74. The junction of cathode resistors 77 and 78 is connected to the plate of diode 71. Resistor 77 which is connected to the cathode of triode 75 is shunted by condenser 79.

The output of the first integrator circuit 35 is taken from the cathode of triode 75 and is applied through resistor 85 and the secondary of transformer 86 to the junction of the plate of diode 87 and the cathode of diode 88. A 400 cycle electrical wave is applied to the primary of transformer 86, said primary having a resistor 84 connected in series therewith and being shunted by condenser 82. The cathode of diode 87 and the plate of diode 88 are respectively connected through resistors 89 and 90 to ground. The cathode of diode 87 is connected to plus battery through resistor 95. The plate of diode 88 is connected to minus battery through resistor 96. The cathode of diode 87 is also connected through condenser 97 to the junction of the cathode of diode 99 and the plate of diode 100. The plate of diode 88 is connected through condenser 98 to the junction of the cathode of diode 101 and the plate of diode 102. Diodes 99—102 are connected in series. The junction of the cathode of diode 100 and the plate of diode 101 is connected to the control grid of triode 103. Capacitor 104 is connected between the control grid of triode 103 and the cathode of triode 75 in the first integrator circuit. The cathode of cathode follower triode 103 is connected through resistors 105 and 106 to minus battery. The plate of diode 99 is connected to the junction of resistors 105 and 106. The cathode of diode 102 is connected to the cathode of triode 103 and through resistor 83 to the junction of resistor 85 and the secondary of transformer 86. The range slew voltage from the range search circuit 38 is applied to the terminal of capacitor 104 which is connected to the grid of triode 103. The other terminal of capacitor 104 is connected to the reject voltage applied through relay 49.

The cathode of tube 103 in the second integrator is connected through resistor 108 to the diode clipper tube 107. The linear sweep from component 12 is connected to the plate of diode 107. The output from circuit 20 to shaper circuit 21 is taken from the cathode of diode 107.

The operation of the first and second integrator circuits will now be explained. A positive bias is applied to the cathode of diode 74 from the cathode of triode 75. A negative bias is applied to the plate of diode 71 from the junction of cathode resistors 77 and 78. These bias voltages hold all of diodes 71–74 at cut-off.

Figure 5:
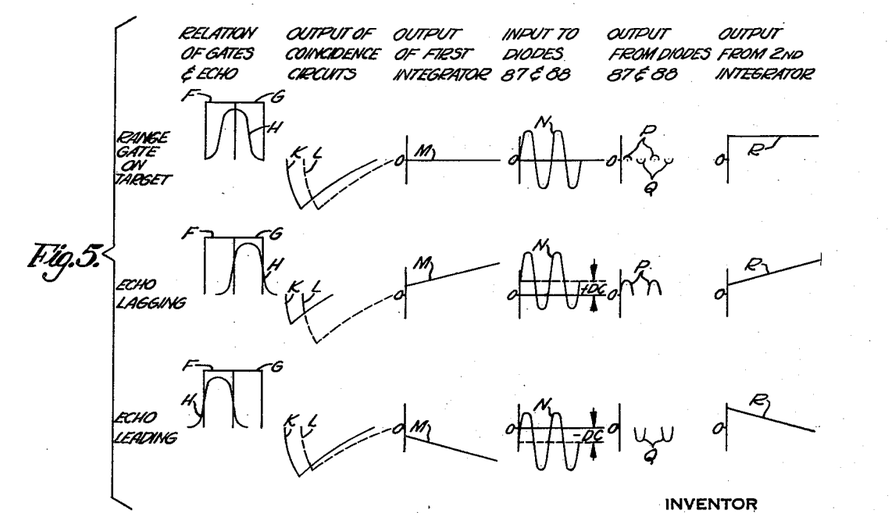
FIG. 5 is a series of curves used in explaining the operation of the first and second integrating circuits.

In FIG. 5 is shown three series of curves each showing waveforms in various parts of the first and second integrator circuit under different relations of coincidence between the gate and the echo. The upper series of waveforms shows the early and late gates, waves F and G, respectively, in proper coincidence with the echo. The middle series of waveforms shows the echo lagging the gates for an incoming target, and the bottom series of waveforms shows the echo leading the gates for an incoming target.

When the sharply decreasing leading edge of the negative pulse (waveforms K in FIG. 5) from the early gate coincidence circuit is applied to condenser 70, it draws current through diode 73 and charges condenser 76 negatively. Current cannot pass through diode 74. On the upswing, current cannot pass through diode 73 but grounds itself through diode 74 and the low impedance of the cathode of triode 75. The reverse action occurs when the negative pulse (waveforms L in FIG. 5) from the late gate coincidence circuit reaches condenser 69. On the sharp down swing the pulse is grounded through diode 71 and tube 75. On the slower upswing condenser 76 charges positively through diode 72. In effect then the pulses from the early gate coincidence circuit through condenser 70 will charge condenser 76 at a negative rate while the pulses from the late gate coincidence circuit through condenser 69 will charge condenser 76 at a positive rate (waveforms M in FIG. 5). Each pulse adds an increment of voltage since the charge on condenser 76 cannot dissipate through the diodes 72 or 73 or through triode 75 in the interval between pulses. If the magnitudes of the pulses from coincident circuits 24 and 27 are equal (i.e., when the echo pulse coincides equally with both the early and late gates) the positive and negative charges will cancel. If one pulse is of greater magnitude than the other (that is the echo lags or leads the gates) the voltage on capacitor 76 will charge either more negatively or more positively. If the echo leads the gate, the early coincidence tube in circuit 24 will conduct more than the late coincidence tube in circuit 27 and the condenser 76 will charge more negatively. If the echo lags the gates, the late gate coincidence circuit will conduct more than the early coincidence circuit and capacitor 76 will charge more positively. As long as an unbalance occurs in either direction condenser 76 will continue to charge linearly. The rate of buildup of charge is determined by the length of time by which the echo pulse leads or lags the gates.

The position of the echo pulse relative to the early and late gates is proportional to the rate of increase or decrease of voltage across the condenser 76, and is therefore proportional to the slope of the voltage out of the cathode of triode 75. No change of voltage out of the cathode 75 into the second integrator means the video coincides with the early and late gates and therefore that the range gates are correctly following the target. Since the second integrator circuit 36 works on the peaks of the 400 cycle voltage introduced through transformer 86, resistor 84 and condenser 82 are included in the primary circuit to give a better waveform. This reduces the primary voltage by half, but transformer 86 has a 2:1 step-up ratio so that the voltage appearing at the plate of diode 87 and the cathode of diode 88 will have a D.C. level equal to the voltage from the first integrator 35. The output from transformer 86 is shown in waveforms N of FIG. 5.

The cathode of diode 87 is biased about 100 volts positive, the plate of diode 87 is biased about 100 volts negative. This bias partially cuts off both of the tubes unless a direct current signal is superimposed on the 115 volt, 400 cycle alternating current signal from transformer 86. A positive bias from the first integrator 35 will raise the direct current level of the signal on the plate of diode 87 so that diode 87 conducts over more of the positive portion of the applied signal than diode 88 conducts on the negative portion of the signal. The magnitude of these positive peaks will vary with the magnitude of the positive voltage from the first integrator. A negative bias from the first integrator would lower the direct current level of the signal on diodes 87 and 88 and enable diode 87 to conduct over more of the negative portion of the cycle than diode 87 conducts on the positive portion of the cycle. As before, the magnitude of the passed voltage peaks will vary with the magnitude of the voltage (now negative) from the first integrator. The output of diodes 87 and 88 is shown by waveforms P and Q respectively of FIG. 5.

From this point on the action of the second integrator is identical to that of the first integrator. Positive pulses passed by diodes 87—88 through condenser 97 will charge condenser 104 positive at a rate proportional to the amplitude of the pulses. Negative pulses passed through condenser 98 will charge condenser 104 negative at a rate proportional to the amplitude of these pulses. The output of the cathode follower 103, shown by waveforms R in FIG. 5, varies with the voltage on condenser 104 and therefore with the output of the first integrator with a slope proportional to that output. The varying output from the second integrator 36 will vary the bias on diode 107 in diode clipper circuit 20 to variably clip the bottom of the linear sweep wave as explained above and shown in waveform C of FIG. 4.

Figure 3:
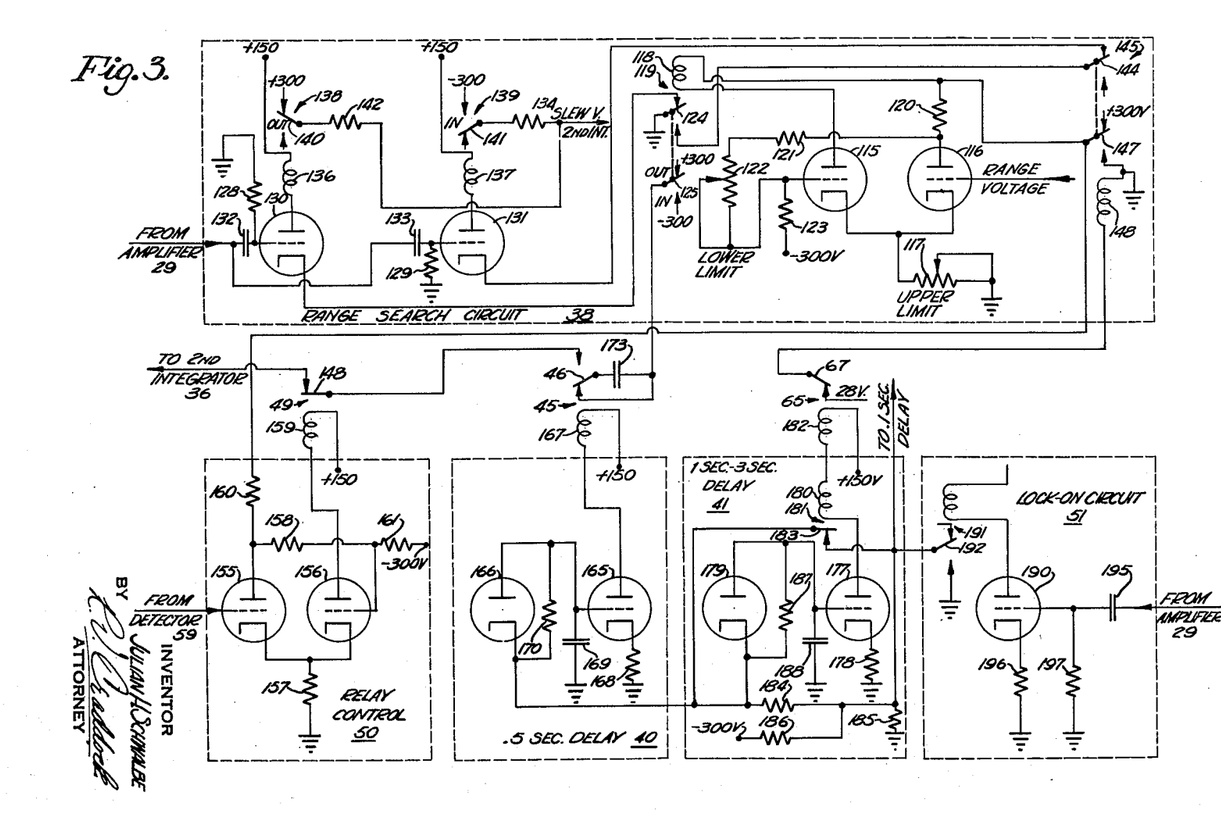
FIG. 3 is a schematic diagram showing the range search circuit, the relay control circuit, the .5 second delay circuit, the 1 second—3 second delay circuit, and the lock-on circuit of FIG. 1.

Reference is now made to FIG. 3 for a more detailed description of the range search circuit 38, the lock-on circuit 51, the relay control circuit 50, the .5 second delay circuit 40, and the 1 second—3 second delay circuit 41, along with relays 45, 49 and 65. The range search circuit 38 has a multivibrator having two steady states and including triodes 115 and 116. The cathodes of triodes 115 and 116 are connected together and this junction is connected to ground through a variable resistor 117. The plate of triode 115 is connected through the energizing coil 118 of relay 119 and through resistor 120 to the plate of triode 116. The plate of triode 116 is connected through resistor 121 and through variable resistor 122 to the control grid of triode 115 which is also connected through resistor 123 to minus battery.

Relay 119 has two movable contact arms 124 and 125. When tube 115 is conducting movable contacts 124 and 125 make contact with the upper stationary contacts. When tube 115 is not conducting contact arms 124 and 125 make contact with the lower stationary contacts.

In the range search circuit, triodes 130 and 131 are also provided. The output of the combined range gate coincidence circuit 28 is applied after amplification and inversion in component 29 to the grid of triode 130 through condenser 132 and is also applied to the grid of triode 131 through condenser 133. The grids of triodes 130 and 131 are connected to ground through resistors 128 and 129, respectively. The plates of triodes 130 and 131 are connected to B+ through coils 136 and 137 of relays 138 and 139 respectively. Relay 138 has a movable contact arm 140 which, in its energized position, makes contact with +300 volts. Relay 139 has movable contact arm 141 which in its upper energized position makes contact with —300 volts. Contact arm 141 is connected to capacitor 104 in the second integrator circuit 36 through relatively small resistor 134, while contact arm 140 is connected to capacitor 104 through relatively large resistor 142 to provide the slew voltage. The cathode of triode 130 is connected to the upper stationary contact associated with movable contact arm 124 of relay 119. The lower stationary contact associated with contact arm 124 is connected to the movable contact arm 144 of relay 145. The upper stationary contact associated with contact arm 144 is connected to the cathode of triode 131.

Relay 145 also includes movable contact arm 147 and energizing coil 148. Contact arm 147 has an upper fixed contact connected to +300 volts and a lower fixed contact connected to ground. Both contact arms 145 and 157 are in their up position when the coil 148 is energized. Contact arm 147 is connected to the junction of coil 118 and resistor 120.

Relay control circuit 50 comprises two triodes 155 and 156 constituting a multivibrator circuit having two stable states. The cathodes of triodes 155 and 156 are connected together and the junction is connected through resistor 157 to ground. The control grid of triode 155 is supplied with an input signal from the output of detector 59. The control grid of triode 156 is connected through resistor 158 to the plate of triode 155 and through resistor 161 to a source of negative potential. The plate of triode 156 is connected through energizing coil 159 of relay 49 to +150 volts. The plate of triode 155 is connected through resistor 160 to the contact arm 147 of relay 145.

The .5 second delay circuit 40 comprises a triode 165 and a diode 166. The plate of triode 165 is connected through energizing coil 167 of relay 45 to +150 volts. The cathode of the triode 165 is connected through resistor 168 to ground. The control grid of triode 165 is connected to the plate of diode 166, and to ground through condenser 169. The cathode of diode 166 is connected through resistor 184 to the output from lock on circuit 51. Diode 166 is shunted by resistor 170. Relay 45 also includes a movable contact arm 46 and upper and lower stationary contacts. Movable contact arm 46 is connected through condenser 173 to the lower fixed contact and to movable contact arm 125 of relay 119 in range search circuit 38. The 1 second—3 second delay circuit 41 is similar to circuit 40 and it includes a triode 177 and a diode 179. The plate of triode 177 is connected through energizing coil 180 of relay 181, and through energizing coil 182 of relay 65 to +150 volts. Relay 181 also includes a movable contact arm 183 which is connected to the cathode of diode 179. The cathode of diode 179 is also connected through resistor 184 to the output from the lock-on circuit 51. The end of resistor 184 remote from the cathodes of diode 179 and 166 is connected to ground through resistor 185 and to −300 volts through resistor 186. Relay 65 includes a movable contact arm which in its normal unenergized condition makes contact with a source of 28 volts. Contact arm 67 is connected to the energizing coil 148 of relay 145. The grid of triode 177 is connected through condenser 188 to ground and also to the plate of diode 179. Diode 179 is shunted by resistor 187. The junction of resistors 184, 186 and 185 is connected to the fixed contact associated with the movable contact arm 183 which is connected to the cathode of diode 179.

A detailed explanation of the operation of the range search circuit 38, the lock-on circuit 51, relay control circuit 50, the .5 second delay circuit 40 and the 1 second—3 second delay circuit 41 will now be given. When the range gate starts slewing slowly out in search of a target, the range voltage applied to the grid of triode 116 in the range search circuit 38 is relatively low. Triode 115 is conducting heavily and the triode 116 is not conducting due to current flow through the common cathode resistor 117. Since triode 115 is conducting, the relay 119 will be energized through coil 118, contact arm 124 will apply ground potential to the cathode of triode 130 causing that tube to be conducting. Triode 131 is cut off by its open cathode. Triode 130 energizes relay 138 through coil 136. This connects contact arm 140 and condenser 104 of the second integrator circuit to +300 volts through resistor 142 causing the range gate to slew out toward maximum range at a rate depending upon the time constant of resistor 142 and condenser 104, and the range voltage applied to the grid of triode 116 will increase.

At some point, depending upon the value to which the cathode resistance 117 is adjusted, the grid voltage of triode 116 will be high enough to overcome the cathode bias and triode 116 will start to conduct. This will cause the plate voltage of triode 116 to drop and thus lower the grid voltage of triode 115 due to the direct coupling between the plate of triode 116 and the grid of triode 115 through resistors 122 and 121. The decrease in voltage on the grid of triode 116 will cause the cathode voltage to drop and thus further decrease the bias on triode 116 causing it to conduct more heavily and its plate voltage to drop still further. Thus, once the action is started by the range voltage increasing to a point to overcome the cathode bias in triode 116, the multivibrator action very rapidly causes the triode 116 to be fully conducting and the triode 115 to cut off.

Relay 119 will then become deenergized, causing contact arm 124 to ground the cathode of triode 131 through contact arm 144 of relay 145. Triode 130 having its cathode circuit opened, will cease to conduct, and triode 131 will begin to conduct. Relay 139 will be energized and relay 138 will be deenergized applying −300 volts through the low value resistor 134 to the upper plate of capacitor 104 in the second integrator circuit 34, causing the range gate to slew rapidly in, at a rate depending on resistor 134 and condenser 104, so that it may again search slowly toward maximum range for a target.

As the range gate slews in, the voltage applied to the grid of triode 116 will decrease. When the range voltage becomes low enough to decrease conduction of triode 116, its plate will rise in voltage causing the grid of triode 115 to increase in voltage and allowing the triode 115 to begin to conduct. This will increase the current in the common cathode resistor 117 causing triode 116 to become less conducting and thus further increasing the plate voltage of triode 116. Hence, in a very short time the triode 116 will be completely cut off and triode 115 fully conducting causing relay 119 to energize and the slew voltage to slew range out. Variable resistor 117 varies the maximum range at which the relay 119 will deenergize and variable resistor 122 determines the minimum range at which relay 119 will energize.

The range gate slews in so rapidly that it normally will not lock on a target echo over which it passes. However, if the range gate coincides with a target echo on the relatively slow outward search, a series of negative pulses appears at the output of the combined coincidence circuit 28. These pulses are amplified and inverted in amplifier-inverter 29 to produce a series of positive pulses which are applied to the grids of triodes 130 and 131 through condensers 132 and 133, respectively. This application of the series of positive pulses causes the grids of triodes 130 and 131 to draw current, charging condensers 132 and 133 negatively and causing tubes 130 and 131 to be nonconductive. The negative charge remains during the interval between pulses due to the large time constant of time constant circuits 128—132 and 129—133. This action causes both relays 138 and 139 to be deenergized, removing the application of the slew search voltages to the condenser 104, and allowing the system to automatically track the acquired target through the operation of the components 20—25, 27, 35, and 36.

The positive pulses provided by the combined coincidence circuit 28 and amplifier inverter 29 are also applied to triode 190 in the lock-on circuit through condenser 195 to which is connected resistor 197. This series of positive pulses causes the grid of tube 190 to draw current, charging condenser 195 negatively, cutting off tube 190 and deenergizing relay 191 through coil 193.

The deenergizing of relay 191 causes ground potential to be applied through contact arm 192, through normally closed contact arm 183 of the 1—3 second delay circuit 41, and through resistors 170 and 187 to the grids of triodes 165 and 177 respectively of the .5 second delay circuit and the 1—3 second delay circuit. Triodes 165 and 177 are normally non-conducting due to the negative bias applied to their grids from the voltage divider consisting of resistors 185 and 186 and applied through diodes 166 and 179 respectively. When the arm 192 of relay 191 is grounded condensers 169 and 188 begin to discharge through resistors 170 and 187. The time constant of elements 169 and 170 is such that .5 second after the acquisition of a target and the operation of relay 191, the grid of tube 165 becomes sufficiently positive to allow the tube to conduct, operating relay 45.

It will be apparent that relays 65 and 181 could be combined in one relay having one energizing coil connected in the plate circuit of triode 177 and having the two contact arms 67 and 183.

If the range was slewing out in its search when the target being tracked was acquired, relay 119 is in its energized position and arm 125 is connected to +300 volts. On the energizing of relay 45, .5 second after the acquisition of the target, arm 46 will connect the +300 volts through condenser 173 to arm 148 of relay 49. If the acquired target does not have the required component of velocity toward the gun, the relay 49 will not be energized, and a positive transient from condenser 173 will be applied to the lower plate of condenser 104 causing the range gate to move out of coincidence with the rejected target and in the outward direction the range gate was moving when the target was acquired. When the target and the combined range gates are moved out of coincidence, positive pulses are no longer applied to condensers 132 and 133 which are charged through resistors 128 and 129. When condensers 132 and 133 are sufficiently charged, the triode of the pair 130—131 having the grounded cathode will conduct. The range slew voltage will be applied to cause the range gates to resume their cyclical search at the point where the target was acquired.

The application of the rejection voltage to move the range gates from the target in the direction the range gates were moving when the target was acquired prevents the system from immediately acquiring the target just rejected. Although there is little likelihood that a target will be acquired on the rapid inward range gate slew, a reject voltage with a polarity appropriate to the range slew direction is provided by contact arm 125 of relay 119 on the possibility that a strong echo might be acquired on the inward range gate sweep.

Triode 156 of the relay control circuit is normally conducting, the relay 49 is normally energized, and the contacts including arm 148 are normally closed. If upon the initiation of the tracking operation, the acquired target is moving toward the gun with sufficient velocity to be retained, the output from detector 59 will be sufficient to raise the potential of the grid of triode 155 to a point where conduction starts in that tube. This causes the plate of triode 155 to become less positive and since the plate of triode 155 is connected directly through resistor 158 to the control grid of triode 156, triode 156 will cease conduction. Coil 159 will become deenergized and contact 48 will open. This provision of a multivibrator circuit including tubes 155 and 156 and having two stable states insures that the relay 49 will be either "on" or "off" with a sharp, fast transition period.

If an acquired target has the necessary movement to deenergize relay 49, then .5 second after the acquisition, when condenser 46 is connected to the open arm 148, the rejection voltage can get no further. The system will continue to track the acquired target. Then, one second after the acquisition, condenser 188 in the 1–3 second relay circuit will have sufficiently charged, through resistor 187 and the ground connection to arm 192 of deenergized relay 191, to cause tube 177 to conduct, energizing relays 65 and 181. This opens contact arm 67 and disconnects the source of +28 volts from the energizing coil 148 of relay 145 opening contact arm 144. The de-energizing of coil 148 also disconnects arm 147 from the source of +300 volts and applies, in its place, ground to the plates of tubes 115 and 116 de-energizing relay 119.

The deenergizing of relay 119 connects grounded arm 124 to arm 144 of relay 145. However relay 145 is also deenergized and arm 144 is open. Accordingly, if the target echo fades momentarily and the grids of tubes 130 and 131 become sufficiently positive to allow conduction, neither tube will conduct because both tubes have open cathode circuits, and the range gate will not be forced off the target by a slew voltage.

The energizing of relay 145 by the 1 second—3 second delay circuit 41 and relay 65 also removes plate voltage from tube 155 and insures that relay 49 will remain energized even though the velocity of a retained target toward the radar equipment falls below the required minimum after the sampling period.

A momentary loss of a retained target would, without some compensating means, cause relay 191 in lock-on circuit 51 to be energized removing the ground connection from the junction of resistors 185 and 186. Since contact arm 183 is now open, due to energization of relay 180, it requires 3 seconds for the condenser 188 to discharge through resistors 187 and 184 so that tube 177 stops conduction and deenergizes relays 180 and 182. This energizes relay 145 enabling the range search circuit 38 to again operate and the system to search for a new target.

The purpose of diodes 166 and 179 in delay circuits 40 and 41 is to allow, upon closing of relay 192 due to rejection of the target and removal of ground potential from the cathodes of tubes 166 and 179, condensers 169 and 188 to charge to the negative potential from voltage divider 185—186 through the low resistance of diodes 166 and 179 rather than through the high resistance 170 and 187. Thus, delay circuits 40 and 41 have a rapid recovery time and, if a new target is acquired immediately after the rejection of a prior target, condensers 169 and 188 will be fully discharged and tubes 165 and 177 will conduct only after the elapse of the predetermined time delays.

The .1 second delay relay 39 may be any circuit capable of providing a .1 second delay between the coincidence of the echo and the combined range gate and the operation of relay 55. However, circuit 39 may advantageously be the same as circuit 40 except for the time constants of the elements giving the desired time delay.

It will be understood by those skilled in the art that the specific automatic range tracking components shown herein are by way of example only and that applicant's target rejection system may be used with any other suitable range tracking components such as those shown in Electronic Time Measurements by Chance, Hulsizer, Mac-Nichol and Williams, vol. 20 of the Radiation Laboratory Series, published in 1949 by the McGraw-Hill Book Co. Inc. For targets moving in elevation or azimuth, or both, with respect to the radar antenna 14, the antenna must be made to track the target in these coordinates either manually or automatically. Automatic means for effecting angle tracking are described in vol. 20 of the Radar Laboratory Series cited above.

It will be seen that applicant has provided a target rejection system using a minimum of simple components, a system which will reject a target because of its velocity or direction, and which will continue to track unrejected targets through short periods of fading.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a range determining means arranged to automatically track an object and provide a quantity indicative of the range to said object, a differentiating means connected to said range determining means to provide a quantity indicative of the rate of change of said range, rejection means connected to said differentiating means and operative when said rate has a predetermined characteristic to cause said range determining means to cease tracking said object.

2. The combination of claim 1 in which the rejection means is operated by said differentiating means when said rate is less than a predetermined minimum.

3. The combination of claim 1 in which the rejection means is operated by said differentiating means when said rate is less than a predetermined minimum and is changing in a predetermined direction.

4. In combination, range tracking means to provide a quantity indicative of the range to an object, range search means to cause said tracking means to search in range for an object when no object is being tracked, rejection means connected to said range tracking means which on operation of said rejection means causes the range means to cease tracking its acquired object and begin range search, differentiation means connected to said range tracking means to provide a quantity indicative of the rate of change of said range, said differentation means being connected to operate said rejection means when said rate is less than a predetermined value.

5. The combination of claim 4 in which there is a connection between said range search means and said rejection means to cause the range search means, upon the rejection of a target, to resume range search in the direction in which the last previous range search was progressing.

6. The combination of claim 4 in which means are provided to prevent operation of said rejection means before the range of said object has been sampled for a predetermined interval.

7. The combination of claim 4 in which there is provided a lock-on circuit for giving an output when the range means is tracking an object, said circuit being connected to operate the switch means after a short delay, said switch means operating to delay the application of said electrical charge from the rejection means by said predetermined amount.

8. The combination of claim 7 in which said lock-on circuit is connected to disable said range search means upon the acquisition of a target by said range track means.

9. In combination, means for automatically tracking a target in range, said tracking means including a capacitor acquiring a charge proportional to the range to the target, search means to cause said tracking means to search in range for a target when no target is being tracked, differentation means connected to said capacitor to provide a voltage proportional to the rate of change of range to the target being tracked, rejection means controlled by said differentiating means and connected to said capacitor to cause said tracking means to cease tracking the acquired target and resume range search.

10. The combination of claim 9, in which there is provided circuit means responsive to said tracking means and operative to disable said search means when a target is being tracked.

11. The combination of claim 9, in which the control of the tracking means by the rejection means is delayed for a predetermined interval after a target is acquired by the tracking means.

12. The combination of claim 11, in which a circuit means becomes operative a predetermined interval after the elapse of said time interval to prevent a momentary disappearance of the target echo from stopping the tracking mode of operation and initiating the search mode of operation.

13. In combination, range tracking means including a capacitor which acquires an electrical charge representative of the range to an object, range search means connected to said capacitor and arranged to supply a cyclically varying charge to said condenser when no object is being tracked to cause said range tracking means to cyclically search in range for an object, differentation means connected to said capacitor to give an output indicative of the rate of change of range to the object, rejection means controlled by said differentation means and connected to said capacitor so that, when said rate of change is greater than a predetermined minimum, said rejection means supplies an electrical charge to said capacitor to cause said range tracking circuit to cease tracking any acquired target and resume a range search operation.

14. In an object pulse detecting and ranging system, means for emitting a series of search pulses, means for producing a gate pulse subsequent to each search pulse, means for varying the time interval between each search pulse and the subsequent gate pulse, means for receiving an echo reflected by an object when impinged upon by a search pulse, range tracking means operating in response to coincidence between said gate and said echo pulses, said range tracking means including a capacitor for acquiring a charge, said capacitor being connected to and controlling said time interval varying means, range search means arranged to apply a cyclically varying charge to said capacitor when no echo is received to cause said gate pulse to search in range for an echo, means to disable said range search means when said gate is in predetermined relation of coincidence with an echo, differentation means connected to said capacitor to provide a voltage indicative of the rate of change of said interval, and rejection means controlled by said differentation means and connected to said capacitor to vary said time interval and force said gate out of coincidence with said echo.

15. The combination of claim 14 in which there is provided means to delay the application of the rejection voltage to the capacitor for a predetermined interval after a target is acquired by the tracking means.

16. The combination of claim 14 in which there is provided a coincidence circuit for providing an output when an echo is in a predetermined relation of coincidence with said gate, said circuit being connected to said rejection means to prevent application of said rejection voltage to said capacitor before a predetermined interval has elapsed after the acquisition of a target by said tracking means.

17. The combination of claim 16 in which a second delay circuit is provided under control of said coincidence circuit for disabling said first delay circuit and said range search means a predetermined time after said first delay circuit operates and which upon the absence of an output in said coincidence circuit provides enabling energy to said first delay circuit and range search circuits after a second predetermined time interval.

18. The system of claim 14 in which the search pulses are radio frequency electro-magnetic waves.

19. In a radio object detection and ranging system, a range determining means to provide an electrical quantity indicative of the range to an object, a differentating means connected to said range determining means to provide a quantity indicative of the rate of change of said range, rejection means connected to said differentiating means and operative to provide a distinctive output when said rate differs in a predetermined way from a predetermined standard.

20. In combination, a range determining means to provide a quantity indicative of the range to an object, a differentiating means connected to said range determining means to provide a quantity indicative of the rate of change of said range, rejection means connected to said differentiating means and operative to provide a distinctive output when said rate differs in a predetermined way from a predetermined standard.

No references cited.